United States Patent
Olofsson et al.

(10) Patent No.: US 9,198,093 B2
(45) Date of Patent: Nov. 24, 2015

(54) IDENTIFYING MOBILE STATION IN A CELLULAR WIRELESS COMMUNICATION SYSTEM

(71) Applicant: Huawei Technologies Co., LTD, Shenzhen (CN)

(72) Inventors: Henrik Olofsson, Kista (SE); Peter Legg, Kista (SE)

(73) Assignee: Huawei Technologies Co., LTD., Shenzhen (CN)

( * ) Notice: Subject to any disclaimer, the term of this patent is extended or adjusted under 35 U.S.C. 154(b) by 213 days.

(21) Appl. No.: 13/901,808

(22) Filed: May 24, 2013

(65) Prior Publication Data

US 2013/0331105 A1    Dec. 12, 2013

Related U.S. Application Data

(63) Continuation of application No. PCT/EP2012/051279, filed on Jan. 27, 2012.

(51) Int. Cl.
*H04W 36/00*    (2009.01)
*H04W 24/00*    (2009.01)
*H04W 8/26*    (2009.01)
*H04W 36/08*    (2009.01)
*H04W 88/12*    (2009.01)

(52) U.S. Cl.
CPC ...... *H04W 36/0055* (2013.01); *H04W 36/0005* (2013.01); *H04W 8/26* (2013.01); *H04W 36/08* (2013.01); *H04W 88/12* (2013.01)

(58) Field of Classification Search
None
See application file for complete search history.

(56) References Cited

U.S. PATENT DOCUMENTS

| 2011/0117908 | A1 | 5/2011 | Huang et al. |
| 2011/0250892 | A1* | 10/2011 | Gupta et al. .................. 455/437 |
| 2012/0157156 | A1 | 6/2012 | Han et al. |

FOREIGN PATENT DOCUMENTS

| WO | 2010080848 A9 | 7/2010 |
| WO | 2011029292 A1 | 3/2011 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.0.0, Dec. 2011, 194 pages.
3rd Generation Partnership Project; Technical Specification Group Radio Access Network; Evolved Universal Terrestrial Radio Access Network; Evolved Universal Terrestrial Radio Access Network (E-UTRAN); X2 application protocol (X2AP) (Release 10), 3GPP TS 36.423 V10.4.0, Dec. 2011, 132 pages.
Huawei, "IRAT MRO," 3GPP TSG RAN WG3 Meeting #69, R3-102057, Madrid, Spain, Aug. 23-27, 2010, 3 pages.

(Continued)

*Primary Examiner* — Erika A Washington
(74) *Attorney, Agent, or Firm* — Slater & Matsil, L.L.P.

(57) ABSTRACT

A method of facilitating identification of a user equipment (UE) is disclosed. A first network control node (NCN) receives an radio link failure (RLF) indication message including a first mobile identity indicator (MII) of a UE. The first NCN determines a second MII of the UE, the second MII being associated with the first MII, and a second NCN associated with the second MII. And the first NCN sends the second MII to the second NCN.

20 Claims, 2 Drawing Sheets

(56) References Cited

OTHER PUBLICATIONS

Huawei, et al., "Introduction of Radio Link Failure Indication procedure," 3GPP TSG-RAN3 Meeting #66, R3-093379, Jeju Island, South Korea, Nov. 9-13, 2009, 13 pages.
Huawei, "MRO for HetNet," 3GPP TSG-RAN WG3 Meeting #75, R3-120126, Dresden, Germany, Feb. 6-10, 2012, 2 pages.
Mediatek, "Connection Failure SON," 3GPP TSG-RAN WG3 #74, R3-112880, Nov. 14-18, 2011, San Francisco, USA, 5 pages.
Nokia Siemens Networks, "X2 support for Rel. 10 SON MRO," 3GPP TSG RAN WG3 Meeting #72, R3-111415, Barcelona, Spain, May 9-13, 2011, 2 pages.
Nokia Siemens Networks, "Enabling MRO in case of re-establishment request in unprepared eNB," 3GPP TSG RAN WG3 Meeting #68, R3-101644, Montreal, Canada, May 10-14, 2010, 4 pages.
Notification of Transmittal of the International Search Report and the Written Opinion of the International Searching Authority, or the Declaration, received in Application No. PCT/EP2012/051279, Applicant: Huawei Technologies Co., Ltd., mailed Oct. 17, 2012, 14 pages.
ZTE, "The Complementarity for the Radio Link Failure Indication," 3GPP TSG-RAN3 Meeting #66bis, R3-100185, Valencia, Spain, Jan. 18-22, 2010, 2 pages.
ZTE, "The Complementarity for the Radio Link Failure Indication," 3GPP RAN3#66bis Meetings, R3-100184, Valencia, Spain, Jan. 18-22, 2010, 2 pages.
Nokia Siemens Networks, "RLF Reports for Mobility Robustness Optimization," 3GPP TSG RAN WG3 Meeting #64, R3-091357, May 4-8, 2009, 6 pages.

* cited by examiner

IDENTIFYING MOBILE STATION IN A CELLULAR WIRELESS COMMUNICATION SYSTEM

CROSS-REFERENCE TO RELATED APPLICATIONS

This application is a continuation of International Application No. PCT/EP2012/051279, filed on Jan. 27, 2012, which is hereby incorporated by reference in its entirety.

TECHNICAL FIELD

The present invention relates to a method for identifying mobile stations in a cellular wireless communication system. Furthermore, the invention also relates to a first network control node device, a second network control node device, a method in a first network control node, a method in a second network control node, a computer program, and a computer program product thereof.

BACKGROUND

Normally a User Equipment (UE) in active mode in a cellular wireless communication network system is handed over from one (source) cell to the another (target) cell as it moves through the network, and data can be transmitted and received without significant interruptions due to these handovers.

The handover (HO) procedure can consist of many steps. In most cellular wireless communication systems, the handover is network controlled, i.e. the UE is commanded by the network when to connect to another cell. The handover is prepared, i.e. the target cell (the cell that UE is moving to) is prepared. Further, the UE is assisted, i.e. the UE provides measurement reports before handover to the serving cell to assist the decision to do handover preparation of target cell(s), and when to leave the serving cell/connect to the target cell.

In the context of handover, the serving cell before handover is often referred to as the source cell. After successful handover the target cell becomes the new serving cell, and so on.

To assist mobility control decisions, the UE can measure several cells and report the results to the network. Different networks and network deployments can have different detailed behaviour, but in most networks it is natural to trigger handover when signal reception from target cell is better than from source cell.

When the serving eNB, associated with the serving cell, receives a measurement report and if it desires to handover the UE to another cell it performs a handover preparation to that cell. Handover preparation involves a signalling exchange between one eNB and another eNB. The source cell requests the handover and passes over UE context information; the target cell decides if it can admit the UE and either accepts or rejects the handover.

Following a successful preparation, the handover execution takes place. The source cell issues the Handover Command to the UE. If, and when the UE receives this correctly it synchronises to the new target cell and sends a synchronisation message on the Random Access Channel (RACH). The target cell then issues an allocation to the UE so that the UE can send a Handover Confirmation message to the target cell.

The final steps, the Handover Completion, do not involve the UE. The source eNB is able to forward data (unacknowledged downlink packets) to the target eNB, and the S1-U interface from the S-GW must be switched from the source to the target ("path switch"). Finally, if the handover is successful, the target eNB issues a UE Context Release message to the source eNB.

In 3GPP there has been considerable study into Self-Organising Networks (SON) for LTE. One part of this is the Handover Parameter Optimisation a.k.a. Mobility Robustness Optimisation (MRO) which is aiming at optimising mobility parameters. This functionality is supported by letting the UE indicate the last serving cell when re-establishing the connection after a failure has occurred.

The reporting from the UE is slightly different depending on the state of the UE. During a Radio Link Failure (RLF), the UE first tries to re-establish the Radio Resource Control (RRC) connection and if this is not successful, it will return to idle mode and be triggered by higher layers to establish a new RRC connection to a cell.

When re-establishing the RRC connection (using the RRC Re-establishment procedure), the UE will provide the identity of the last serving cell (i.e., Physical Cell Identity, PCI) and the UE identity used in the last serving cell, i.e., Cell Radio Network Temporary Identifier (CRNTI), as well as (optionally) a 16 bit long field called shortMAC-I. In addition to this, the UE may also indicate that it can provide a RLF report, which for example contains a set of radio measurements at the point of failure. The eNB receiving the re-establishment request may choose to reject this, and in this case, the RLF report will not be transmitted.

When establishing an RRC connection from idle state, the UE will not include the PCI, CRNTI or shortMAC-I in the request itself. Instead, the UE may separately send the RLF report which includes information about for example last serving cell as well as the radio measurements at the point of failure.

MRO is defined to distinguish between three different failure cases, namely:

Too late—a scenario where handover is triggered too late, for example when a failure occurs in a source cell before or after handover is initiated and where the UE re-establishes the connection in another cell.

Too early—a scenario where handover is triggered too early, for example when the UE fails to connect to the target cell or when the UE connects but the radio link fails shortly after the (successful) handover.

Wrong cell—a scenario where UE is told to connect to one cell but fails there during or after handover and the UE re-establishes the connection in a third cell.

The general idea is that the cell where the UE attempts to re-establish will send an RLF Indication message over the X2 interface to the last serving cell and this cell can use the information to adjust the mobility parameters. In some cases, the information is forwarded further by the last serving cell to a third cell. This is because during the handover procedure, after the RACH succeeds, the UE will consider the target cell as the serving cell. Hence, in the two latter scenarios above, when the failure occurs shortly after a successful handover, the information must be forwarded to the serving cell before handover and not the last serving cell. This is accomplished with the Handover Report message.

Example of a too early handover (see FIG. 1). Handover from cell A (part of eNB A) to cell B (part of eNB B) succeeds. Shortly afterwards a RLF occurs, UE attempts re-establishment in cell A (1), eNB A sends a RLF Indication to eNB B (2), cell B recognises that the failure occurred shortly after a handover (by using a timer) and eNB B sends a Handover Report to eNB A (3). In the future, cell A can avoid similar failures by making it more difficult to handover to cell B which represents an unreliable target cell, e.g., only an isolated pocket of good coverage.

Example of a handover to wrong cell (see FIG. 2). Handover from cell A to cell B succeeds. Shortly afterwards a RLF occurs, UE attempts re-establishment in a third cell C that is part of eNB C (1), eNB C sends a RLF Indication to eNB B (2), eNB B recognises that the failure occurred shortly after a handover (it uses a timer) and sends a Handover Report to eNB A (3). In the future, call A can avoid similar failures by making it more difficult to handover to cell B which represents an unreliable target cell, e.g., only an isolated pocket of good coverage, or it can make it easier to handover to cell C which represents a better target cell.

However, to improve handover performance in such systems there is a need for a method by which mobile stations can be identified.

SUMMARY OF THE INVENTION

An object of the present invention is to provide a solution which mitigates or solves the drawbacks and problems of prior art solutions. Another object of the invention is to provide a solution which makes it possible to identify mobile stations in connection with handovers so that radio network parameters can be analysed and/or adjusted so as to improve system performance.

According to a first aspect of the invention, the above mentioned objects are achieved by a method for identifying mobile stations in a cellular wireless communication system, said cellular wireless communication system comprising one or more mobile stations and at least one first network control node serving at least one associated first cell and at least one second network control node serving at least one associated second cell; said cellular wireless communication system being arranged to employ handover procedures when mobile stations are handed over from one cell to another cell; said method comprising the steps of handing over a mobile station from said first cell to said second cell, transmitting, by said second network control node, at least one mobile identity indicator to said first network control node, said transmitting step being triggered by at least one occurrence of a handover failure or a radio link failure for said mobile station, receiving, by said first network control node, said at least one mobile identity indicator, and identifying, by said first network control node, said mobile station by using said at least one mobile identity indicator.

Embodiments of the method in a cellular wireless communication system are defined in the appended dependent claims.

According to a second aspect of the invention, the above mentioned objects are achieved by a method in a first network control node for identifying mobile stations, said first network control node being arranged to serve at least one associated first cell of a cellular wireless communication system; said cellular wireless communication system further comprising one or more mobile stations and at least one second network control node serving at least one associated second cell; said cellular wireless communication system being arranged to employ handover procedures when mobile stations are handed over from one cell to another cell; said method comprising the steps of handing over a mobile station from said first cell to said second cell, receiving at least one mobile identity indicator in a transmission from said second network control node, wherein said transmission is triggered by at least one occurrence of a handover failure or a radio link failure for said mobile station, and identifying said mobile station by using said at least one mobile identity indicator.

According to a third aspect of the invention, the above mentioned objects are achieved by a method in a second network control node for transmitting information, said second network control node being arranged to serve at least one associated second cell of a cellular wireless communication system; said cellular wireless communication system further comprising one or more mobile stations and at least one first network control node arranged to serve at least one associated first cell; said cellular wireless communication system being arranged to employ handover procedures when mobile stations are handed over from one cell to another cell; said method comprising the steps of receiving a mobile station to said second cell by a successful handover from said first cell to said second cell, and transmitting at least one mobile identity indicator for said mobile station to said first network control node, wherein said transmitting step is triggered by at least one occurrence of a handover failure or a radio link failure for said mobile station.

The methods according to the invention may be implemented in a computer program, having code means, which when run in a computer causes the computer to execute the steps of the methods. The computer program may be included in a computer program product.

The invention also relates to a first network control node device and a second network control node device corresponding to the above mentioned methods.

The present invention provides a novel way of identifying mobile stations in connection with handover in cellular wireless communication systems. Especially, the invention provides means for a network control node receiving a mobile identity indicator to utilise stored mobile station context information for analyzing and/or adjusting radio network parameters. Preferably, mentioned radio network parameters are mobility parameters used in handover procedures. Thereby, system performance, such as handover success rate can be improved.

Further applications and advantages of the invention will be apparent from the following detailed description.

BRIEF DESCRIPTION OF THE DRAWINGS

The appended drawings are intended to clarify and explain different embodiments of the present invention in which.

DETAILED DESCRIPTION OF ILLUSTRATIVE EMBODIMENTS

Figure 1:
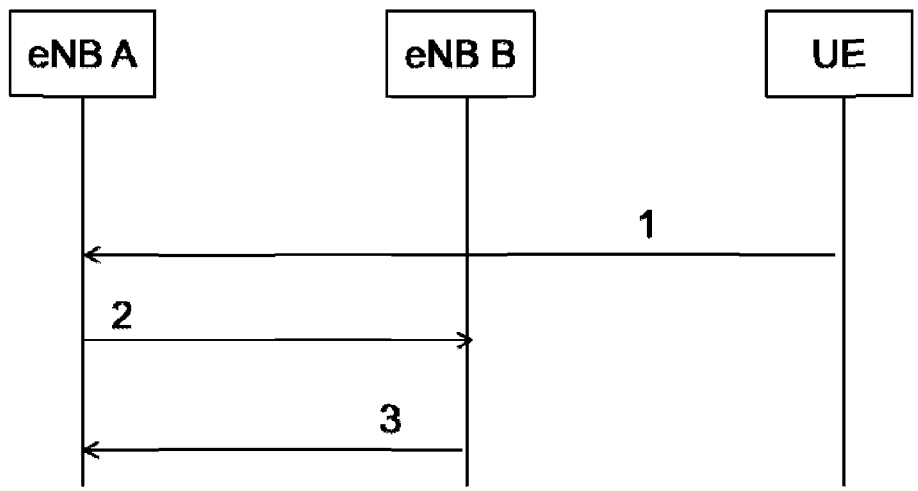
FIG. 1 illustrates a too early handover.

To achieve aforementioned and other objects, the present invention relates to a method in cellular wireless communication systems employing handover procedures, such as 3GPP communication systems, e.g. GSM, UMTS, and LTE.

The present method comprises the steps of: handing over a mobile station from a first cell (cell A) to a second cell (cell B); transmitting, by the second network control node (node B), at least one mobile identity indicator to the first network control node (node A), the transmitting step being triggered by at least one occurrence of a handover failure or a radio link failure for the mobile station; receiving, by the first network control node, the at least one mobile identity indicator; and identifying, by the first network control node, the mobile station by using the at least one mobile identity indicator. Examples of network control nodes are base station controllers (BSC), radio network controllers (RNC), eNBs or any other suitable control nodes; while the mobile stations in some systems are UEs.

At present, re-using information about a UE is only possible if the UE is performing RRC re-establishment since it is only in this case where the UE can provide the CRNTI in the last serving cell. And then it is only possible for the eNB receiving the RLF Indication message, and not for the cell receiving the Handover Report message, since this message does not include any means for the eNB to identify which UE this message is related to whilst the RLF Indication message includes the CRNTI. Each eNB uses a CRNTI to identify a UE. This CRNTI is only valid in the serving cell. In order to make signalling efficient the value range is relatively small (65536 values). Therefore, a CRNTI assigned to a certain UE which is leaving the cell, will be re-used in due course for a new incoming UE. This means that if only the CRNTI is used to retrieve the stored information this is only possible within a relatively short time span.

In the prior art the Handover Report can indicate a too early handover or a handover to wrong cell but the recipient is unable to recognise which UE that has suffered this failure. Recognition of the UE would allow the recipient to make better and more informed decisions about any adjustments for future handovers. For example, knowledge of the loading of the network at the time of the handover could be used to recognise that failures occur more frequently at high loads and future adjustments should be made at such times. For example, the velocity of the UE could be known and correlation between handover performance and speed determined. Such improvements require the eNB A to hold such information about the UE (plus prevailing conditions at the time of the handover or shortly afterwards for the load example above) after the UE has been handed over.

A serving cell has full knowledge about the configuration that was used by the UE in that specific serving cell. It is therefore possible for this eNB to store this configuration information and in some cases re-use it to analyze the failure cause and to determine how to adjust the mobility parameters. Therefore, the first and second network control nodes should be arranged to store the so called network context information about the mobile station so as to be able to analyze and/or adjust one or more radio network parameters using the mobile identity indicator and mentioned network context information. Examples of radio network parameters that can be adjusted and/or analyzed are e.g. handover offsets, handover time to trigger, DTX settings, scheduler parameters, etc. The first network control node of prior art deletes the network context information once the handover to the second network control node has completed. According to the present invention this behaviour is changed, and the first network control node holds a context for the UE once the handover has taken place. In contrast to prior art, according to one embodiment of the invention, the second network control node holds additional information that relates to parts of the context held by the first network control node.

In one embodiment a network control node holds a context for a UE after the UE has been handed over to another cell until a timer has expired or a message is received telling that the UE has performed a subsequent handover to a third cell (or a handover report is received and acted upon). For example, eNB A could hold the UE context until it receives a message from eNB B stating that the UE has handed over to cell C (the third cell).

Figure 2:
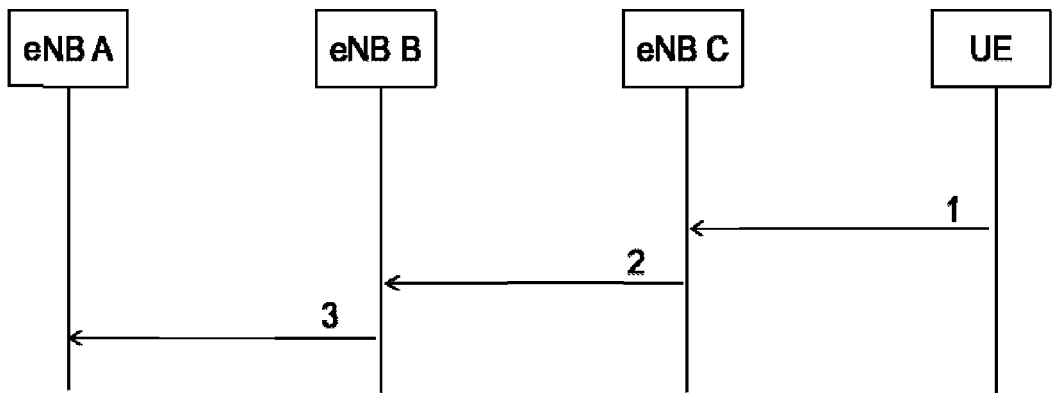
FIG. 2 illustrates a handover to wrong cell.
Figure 3:
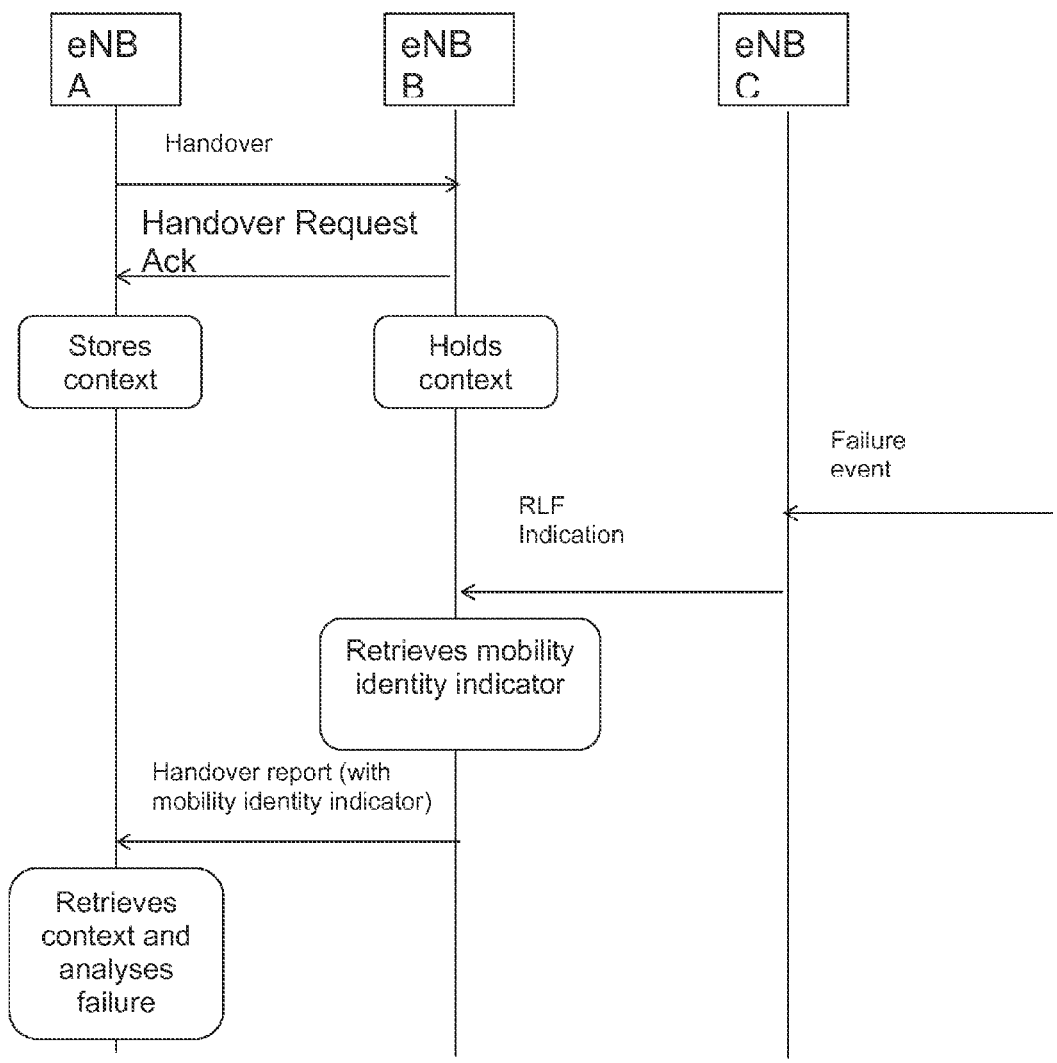
FIG. 3 illustrates the exchange of information between different cells according to the present invention.

Preferably, the radio network parameters are mobility parameters, such as handovers offsets. Handover offsets, such as the cell specific offset (known as Ocn in LTE systems), may be used to tune the timing of the handover execution between two cells. In the case of a too early handover from cell A to cell B, the offset to cell B may be increased (Ocn is decreased) so that the handover is more difficult and this can alleviate the too early handover failures. In the case of a handover to wrong cell (FIG. 2), the cell A can make it easier to handover to cell C and/or make it more difficult to handover to cell B using the offset. This can alleviate handover to wrong cell. In the existing art, such changes can be made but it is not possible to know which individual UEs suffered the failures or if they had particular characteristics. The invention allows cell A (the first cell) to recognize the UE and to look up its context. This context can include the offset values used at the time of the handover to cell B—when different UEs are configured with different offset values for the handover between cell A and B, this is valuable information. Different offset values are used, e.g. when Mobility Load Balancing (MLB) is employed.

According to another preferred embodiment of the invention, the mobile identity indicator is embedded in a Handover Report message transmitted from the second network control node (node B) to the first network control node (node A). The Handover Report message is an existing message that is used in the use-cases of handover too early and handover to wrong cell described above. By embedding the mobile identity indicator within the Handover Report message the network control node of cell A can identify the UE to which the Handover Report refers to.

The mobile identity indicator of the present invention should have information content which makes it possible for a network control node to identify a specific mobile station. The inventors have recognized the following existing information content bearers suitable for this task: CRNTI for the mobile station used by the first network control node—this is a identity field (16 bits) sent from eNB A to eNB B in the Handover Request message that forms the start of the handover preparation procedure; CRNTI for the mobile station used by the second network control node—this is a identity field (16 bits) that could be sent from eNB B to eNB A in the Handover Request Acknowledge message that follows the Handover Request message. Alternatively another possible message that could be used is the UE Context Release sent from eNB B to eNB A at the end of the handover; A security key for the mobile station—an example of such a security key is the "Key eNodeB Star" (KeNB*) parameter (32 bits long) sent from eNB A to eNB B in the Handover Request message. The LTE security mechanisms employ multiple keys and a different one could be used. The Key eNodeB Star is very long and the risk of a collision (contexts stored for two users with the same target cell (B) have the same Key eNodeB Star) is very low; A ShortMAC-I for the mobile station—the Short-MAC-I represents a security field that is used by the mobile station during RRC re-establishment. The value of the field depends upon the identity of the cell where re-establishment is attempted. Values (for different potential re-establishment target cells) are sent from eNB A to eNB B in handover preparation (Handover Request, ReestablishmentInfo, see 3GPP TS36.331 clause 10.3 inside AS-Context and 3GPP TS36.423 9.1.1.1 IE RRC Context); X2AP ID for the mobile station used by the first network control node or X2AP ID for the mobile station used by the second network control node—the X2AP ID [0 . . . 4095] is an identity value used to identify a particular UE when signalling messages are passed over the X2 interface. One X2AP ID is the so called old X2AP ID which is sent by eNB A in the Handover Request message to eNB B. Another is the X2AP ID which is assigned by eNB B during handover preparation and is sent back to eNB A in the Handover Request Acknowledge message, identity of the first cell, or identity of the second cell—different cell IDs could be used, wherein one is the ID of the source cell (in eNB A) and is sent to eNB B in the Handover Request message (ReestablishmentInfo). Another is the identity of the target cell, and is sent by eNB B back to eNB A in the Handover Request Acknowledge message, and a timestamp for the handover—different time stamps could be used, wherein one is the time of the incoming handover. This is the time when the handover occurred, either as an absolute time stamp or as a timer indicating the difference in time for when the last handover occurred and when the Handover Report is triggered.

However, the invention is not limited to the above mentioned examples but may involve other suitable content bearers, a fact which is realized by the skilled person.

According to yet another embodiment of the invention the transmitting step is triggered by a RLF Report transmitted from the mobile station to a network control node of the cellular wireless communication system. Preferably, the report comprises a CRNTI and/or a ShortMAC-I for the mobile station used by the second network control node to determine the at least one mobile identity indicator. The second network control node must hold the UE context, either UE is still attached to one of its cells or the context is saved after a failure in one its cells. When the RLF Report is received by the second network control node it uses the CRNTI value and/or short MAC-I to identify which UE suffered a failure. It can then determine the mobility identity indicator which can be included in a message sent to the first network control node. This indicator may differ from the CRNTI value and /or short MAC-I (for example, it could be an X2AP ID).

According to another embodiment the transmitting step is triggered by a radio resource control (RRC) Re-establishment Request message transmitted from the mobile station to a network control node of said cellular wireless communication system. The RRC Re-establishment Request message is sent by the UE as part of the RRC re-establishment procedure. This procedure follows a RLF or handover failure. After the failure the UE performs cell selection, and if successful it sends the RRC Re-establishment Request message to the cell which is selected.

According to yet another embodiment the transmitting step is triggered by reception at the second network control node of a RLF Indication message transmitted from another network control node of the cellular wireless communication system. This message may be generated under two circumstances. Firstly, a cell receives a RRC Re-establishment Request message and its eNB (network control node) then sends a RLF Indication message to the cell identified by the message. Secondly, after a RLF or handover failure the UE falls to idle mode and then reconnects from idle later indicating that it has a RLF Report available. If the cell (or another cell after a subsequent handover) requests the RLF Report it is then in a position to send a RLF Indication message to the eNB of the cell identified by the RLF Report.

Furthermore, the step of handing over the mobile station from the first cell to the second cell involves, according to an embodiment: exchanging the mobile identity indicator between the first network control node and the second network control node. Preferably, the mobile identity indicator in this case is selected from the group comprising: cell radio network temporary identifier (CRNTI) for the mobile station used by the first network control node, cell radio network temporary identifier (CRNTI) for the mobile station used by the second network control node, a security key for the mobile station, a ShortMAC-I for the mobile station calculated by the first network control node, X2AP ID for the mobile station used by the first network control node, X2AP ID for the mobile station used by the second network control node, identity of the first cell, and identity of the second cell.

A scenario in which the UE performs RRC re-establishment is described as follows. In this scenario the UE is connected to cell A handled by eNB A, and is handed over to cell B handled by eNB B, and a failure occurs while connected to cell B (within a short time period), and the UE performs RRC re-establishment to cell C handled by eNB C.

Note, in step 4 the re-establishment may not succeed but RRC Re-establishment Request message from the UE is received by eNB C (this is necessary for an RLF Indication message to be sent to eNB B).

In this case the UE will provide: the CRNTI cell B; the identity of cell B (PCI); and the short MAC-I (this is a bit string generated by an encryption engine using the a) the current security key it has, b) the source cell PCI, c) re-establishment cell id) to cell C in the RRC re-establishment request. The shortMAC-I is included in the subsequent RLF Indication message if the eNB C has multiple neighbours with the same PCI value that matches the value sent by the UE. The same message is sent to all such neighbours, only the true cell B will be able to generate the same shortMAC-I value.

The eNB C then sends a RLF Indication with the CRNTI, PCI and (optionally) short MAC-I to the eNB C. This enables the eNB B to access stored information about this UE. After the analysis in the eNB B (including checking the time since the incoming handover of the UE from cell A) the eNB B will send the Handover Report message to the eNB A. However, in order for the eNB A to access any stored information for the UE in the eNB A, the eNB B must provide information that enables the eNB A to identify the UE (and of course A must store contextual information on the UE after it has been handed over to cell B). It will not be enough to use the CRNTI used in the eNB B, since this is not known in eNB A.

The proposal is therefore that at each handover, from the eNB A to the eNB B (in this particular example), the eNB A and the eNB B exchange information during the handover preparation (e.g. Handover Request and Handover Request Acknowledge). The two eNBs then store this information locally. Later, when a RLF triggers the transmission of a RLF Indication message from the eNB C to the eNB B, the eNB B retrieves the UE specific information and includes part of this retrieved information in the Handover Report, thereby enabling the receiving eNB A to retrieve the stored UE specific information valid in the scope of the eNB A.

As mentioned above, example of information that could be stored in eNB B and in eNB A after handover preparation is: cell radio network temporary identifier (CRNTI) for the mobile station used by the first network control node, cell radio network temporary identifier (CRNTI) for the mobile station used by the second network control node, a security key for the mobile station, a ShortMAC-I for the mobile station determined by the first network control node, X2AP ID for the mobile station used by the first network control node, X2AP ID for the mobile station used by the second network control node, identity of the first cell, and identity of the second cell.

Scenario in which the UE transits to idle state and then generates a RLF Report in this scenario, the UE will currently not provide the CRNTI or any means for the eNB B to retrieve the stored information about this UE. There have however been discussions to include the CRNTI in the RLF Report. Provided that enough information is included so that the eNB B can retrieve stored information about the UE, the eNB B can perform the same actions as indicated above to allow the eNB A to identify which UE an incoming Handover Report message is related to.

Reporting of the CRNTI is not supported in current specifications when reporting from idle mode. Therefore, one solution would also be to include the CRNTI in the UE RLF Report from idle mode. Note however that due to the delayed transmission of the RLF report from idle mode (up to 48 hours after the RLF event itself) and since the CRNTI is only unique in one cell during a given time, there may be a need to add some more information to distinguish between different UEs using the same CRNTI at different times. On the other hand, the reported cell identities are globally unique. One solution to uniquely identify the UE based on the CRNTI would be to re-use the shortMAC-I, which was originally used in the Re-establishment Request message, and include this in the RLF Report sent by the UE.

In the following text some further exemplary embodiments of the invention are presented and discussed.

Case I: RLF indication triggered at RRC re-establishment in this case, the UE provides the CRNTI and optionally a shortMAC-I to the eNB C which sends this in an RLF indication message to eNB B. The eNB B retrieves information for this UE, and includes for example the CRNTI used in cell A together with the time the handover from the eNB A to the eNB B occurred (as a timestamp or the elapsed time since this handover occurred) in the Handover Report to eNB A. This provides enough information for the eNB A to retrieve the context of this specific UE.

Case II: RLF indication triggered at RRC connection setup; adding CRNTI and shortMAC-I to the RLF report)

Similar to case I above, the UE provides the CRNTI and shortMAC-I used in the eNB B (but carried in the RLF report) to the eNB C which sends this in a RLF Indication message to the eNB B. The eNB B retrieves information for this UE, and includes for example the CRNTI used in cell A together with the time the handover from the eNB A to the eNB B occurred (as a timestamp or the elapsed time since this handover occurred) in the Handover Report to cell A. This provides enough information for the eNB A to retrieve the context of this specific UE.

Case III: RLF indication triggered at RRC connection setup; adding CRNTI and time between RLF and RRC re-establishment in the RLF report.

The UE provides the CRNTI used in the eNB B and the time between the failure and the re-establishment (from idle) to the eNB C. The eNB sends this in a RLF Indication message to the eNB B. The eNB B retrieves information for this UE, and includes for example the CRNTI used in cell A together with the time the handover from eNB A to eNB B occurred (as a timestamp or the elapsed time since this handover occurred). This provides enough information for the eNB A to retrieve the context of this specific UE. Another possibility is to re-use the reported time between the failure and the re-establishment (from the RLF report) since the time between failure and handover should be very small according to the definition of the wrong cell or too early failure case. Instead of reporting the time between the failure and the re-establishment in the RLF Report, another option is to report the time between the failure and the actual transmission of the RLF Report from the UE. This may be beneficial since the actual transmission of the RLF Report may not occur immediately after re-establishing the connection from idle.

Moreover, the method in a system can be separated into a method in a first network control node for identifying mobile stations and a method in a second network control node for transmitting information, respectively. The former method comprises the steps of: handing over a mobile station from a first cell to a second cell; receiving at least one mobile identity indicator in a transmission from the second network control node, wherein the transmission is triggered by at least one occurrence of a handover failure or a radio link failure for the mobile station; and identifying the mobile station by using the at least one mobile identity indicator. And the latter method comprises the steps of: receiving a mobile station to a second cell by a successful handover from a first cell to the second cell; and transmitting at least one mobile identity indicator for the mobile station to the first network control node, wherein the transmitting step is triggered by at least one occurrence of a handover failure or a radio link failure for the mobile station. Obviously, these methods may be modified according to the above described embodiments, and may also be implemented in first and second network control node devices, respectively.

Furthermore, as understood by the person skilled in the art, any method according to the present invention may also be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Finally, it should be understood that the present invention is not limited to the embodiments described above, but also relates to and incorporates all embodiments within the scope of the appended independent claims.

What is claimed is:

1. A method of facilitating identification of a user equipment (UE), the method comprising:
   receiving, by a first network control node (NCN), an radio link failure (RLF) indication message including a first mobile identity indicator (MII) of the UE;
   determining, by the first NCN, a second MII of the UE, the second MII being associated with the first MII;
   determining, by the first NCN, a second NCN associated with the second MII; and
   sending, by the first NCN, the second MII to the second NCN.

2. The method of claim 1, wherein the RLF indication message is sent to the first NCN from a third NCN after the third NCN receives a RLF report from the UE.

3. The method of claim 1, wherein the second MII is sent to the second NCN by the first NCN via a handover report message.

4. The method of claim 1, wherein the second MII is designated to be used by the second NCN to adjust one or more radio network parameters of the second NCN after the second NCN receives the second MII from the first NCN.

5. The method of claim 1, wherein the UE is instructed to hand over from the second NCN to the first NCN before the RLF indication message is received by the first NCN.

6. The method of claim 1, wherein the second MII is allocated by the second NCN to identify the UE.

7. The method of claim 6, wherein the second MII is sent from the second NCN to the first NCN in a process of the UE handing over from the second NCN to the first NCN before the RLF indication message is received by the first NCN.

8. The method of claim 1, wherein the first NCN is a base station associated with a serving cell of the UE.

9. The method of claim 1, wherein the first MII is allocated by the first NCN to identify the UE.

10. The method of claim 9, wherein the first MII is a cell radio network temporary identifier (CRNTI).

11. A Network Control Node (NCN) comprising at least one processor being configured to:
   receive an radio link failure (RLF) indication message including a first mobile identity indicator (MII) of a user equipment (UE);
   determine a second MII of the UE, the second MII being associated with the first MII;
   determine a second NCN associated with the second MII; and
   send the second MII to the second NCN.

12. The NCN of claim 11, wherein the second MII is sent to the second NCN via a handover report message.

13. The NCN of claim 11, wherein the processor is further configured to:
   receive the second MII from the second NCN in a process of the UE handing over from the second NCN to the NCN before the RLF indication message is received by the NCN.

14. The NCN of claim 11, wherein the NCN is a base station associated with a serving cell of the UE.

15. The NCN of claim 11, wherein the first MII is allocated by the NCN to identify the UE.

16. The NCN of claim 15, wherein the first MII is a cell radio network temporary identifier (CRNTI).

17. A system comprising a first network control node (NCN) communicatively coupled with a second NCN, both of the first NCN and the second NCN being capable of communicating with a user equipment (UE), wherein the first NCN is configured to:
   receive an radio link failure (RLF) indication message including a first mobile identity indicator(MII) of the UE;
   determine a second MII of the UE, the second MII being associated with the first MII;
   determine a second NCN associated with the second MII; and
   send the second MII to the second NCN.

18. The system of claim 17, wherein the second MII is sent to the second NCN via a handover report message.

19. The system of claim 17, wherein the second MII is designated to be used by the second NCN to adjust one or more radio network parameters of the second NCN after the second NCN receives the second MII from the first NCN.

20. The system of claim 17, wherein the UE is instructed to hand over from the second NCN to the first NCN before the RLF indication message is received by the first NCN.

* * * * *